United States Patent
Byun et al.

(10) Patent No.: US 7,746,442 B2
(45) Date of Patent: Jun. 29, 2010

(54) LIQUID CRYSTAL DISPLAY DEVICE

(75) Inventors: Yong Sang Byun, Kumi-shi (KR); Kyung Su Chae, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 984 days.

(21) Appl. No.: 11/373,997

(22) Filed: Mar. 14, 2006

(65) Prior Publication Data
US 2006/0170857 A1    Aug. 3, 2006

Related U.S. Application Data

(62) Division of application No. 10/602,606, filed on Jun. 25, 2003, now Pat. No. 7,042,545.

(30) Foreign Application Priority Data
Nov. 12, 2002   (KR) ............................. P2002-78823

(51) Int. Cl.
   *G02F 1/1339*   (2006.01)

(52) U.S. Cl. ..................................................... 349/156
(58) Field of Classification Search ................. 349/156
   See application file for complete search history.

(56) References Cited

U.S. PATENT DOCUMENTS

| | | | |
|---|---|---|---|
| 6,067,144 A | 5/2000 | Murouchi | |
| 6,678,030 B2 | 1/2004 | Imabayashi et al. | |
| 6,705,584 B2 | 3/2004 | Hiroshima et al. | |
| 2002/0149734 A1 | 10/2002 | Melnik et al. | |
| 2003/0025868 A1* | 2/2003 | Hiroshima et al. | 349/156 |

* cited by examiner

*Primary Examiner*—James A Dudek
(74) *Attorney, Agent, or Firm*—McKenna Long & Aldridge

(57) ABSTRACT

A liquid crystal display device including opposite first and second substrates, and column spacers between the first and second substrates, the column spacers formed such that the column spacers differ in size as positions of the column spacers differ, thereby accommodating the variation in gap between substrates when liquid crystal is concentrated at a lower end of the display due to gravity when a large LCD panel is in a vertical position.

8 Claims, 8 Drawing Sheets

LIQUID CRYSTAL DISPLAY DEVICE

This application is a divisional of U.S. Pat. application Ser. No. 10/602,606, filed on Jun. 25, 2003 now U.S. Pat. No. 7,042,545, which claims the benefit of Korean Application No. P2002-78823 filed on Dec. 11, 2002, which is hereby incorporated by reference for all purposes as if fully set forth herein.

BACKGROUND. OF THE INVENTION

1. Field of the Invention

The present invention relates to a liquid crystal display device, and more particularly, to a liquid crystal display device, with a gap supporting part that prevents defects caused by gravity.

2. Discussion of the Related Art

With the development of an information oriented society, the demands on display devices have increased. To meet the demands, different flat display devices have recently been developed for use in various devices, such as the Liquid Crystal Display Device (LCD), the Plasma Display Panel (PDP), the Electro Luminescent Display (ELD), and the Vacuum Fluorescent Display (VFD).

Among the flat display devices, LCD devices have been used the most widely as portable display devices replacing the Cathode Ray Tube (CRT) because LCD devices have excellent picture quality, are light weight, are thin, and have low power consumption. In addition to portable LCD devices, LCD devices are under development for televisions and computer monitors.

The LCD device has a liquid crystal panel for displaying a picture and a driver that provides a drive signal for the liquid crystal panel. The liquid crystal panel has a lower substrate and an upper substrate opposite to each other with a gap between the substrates and a liquid crystal layer between the two substrates. The liquid crystal panel displays an image by controlling the light transmittivity of the liquid crystal with an electric field formed between the two substrates.

The structure and operation of a related art liquid crystal panel in an LCD device will be described briefly with reference to FIG. 1. In FIG. 1, the liquid crystal panel has a lower substrate 22 bonded to an upper substrate 5 with a gap between the substrates and a liquid crystal layer 14 injected between the lower substrate 22 and the upper substrate 5.

The lower substrate 22 has a plurality of gate lines 13 arranged in one direction at fixed intervals and a plurality of data lines 15 arranged in a direction substantially perpendicular to the gate lines at fixed intervals that define a pixel regions P. The lower substrate 22 has a plurality of pixel electrodes 17 in pixel regions P defined by the gate lines and the data lines, and a plurality of thin film transistors T are formed at the cross parts of the gate lines 13 and the data lines 15.

The upper substrate 5 has a black matrix layer 6 for shielding the thin film transistors T, gate lines 13, and data lines 15 from light. The upper substrate also has a R, G, B color filter layer 8 for displaying colors and a common electrode 18 for implementing a picture.

The thin film transistor T has a gate electrode projecting from the gate line 13, a gate insulating film (not shown) formed on the entire surface, an active layer on the gate insulating film over the gate electrode, a source electrode projecting from the data line 15, and a drain electrode arranged opposite to the source electrode. The pixel electrode 17 is formed of a transparent conductive metal such as indium-tin-oxide (ITO).

The LCD device can display a picture by controlling the amount of light passing through the liquid crystal layer 14 by changing the orientation of the liquid crystal layer 14. The orientation of the liquid crystal layer at the pixel electrode 17 is set according to a signal from the thin film transistor T.

A related art method for fabricating the liquid crystal panel will be described, briefly. FIG. 2 illustrates a flow chart of the steps for a related art method of fabricating a liquid crystal panel.

A plurality of gate lines with gate electrodes are formed in one direction on a panel region of a large sized glass substrate, which is used for forming a plurality of panels. Next, a gate insulating film is deposited on an entire surface, an active layer is formed on the gate insulating film over the gate electrode, and a plurality of data lines are formed in a direction substantially perpendicular to the gate lines such that source and drain electrodes are disposed on opposite ends of the active layer. Then, a protection film is formed on the entire surface, a contact hole to the drain electrode is formed, and a pixel electrode is formed in the pixel region, to form a thin film transistor array (st1).

A polymer thin film is deposited on the substrate with the thin film transistor array and aligned by rubbing or optical alignment (st2). The rubbing or optical alignment process fixes the initial orientation of the liquid crystal, enables regular driving of the liquid crystal, and provides uniform display performance. In general, the alignment film is typically formed of an organic polymide group.

A seal pattern for bonding the substrates is printed on the periphery of each panel region of the glass substrate having the alignment film formed thereon (st3). The seal pattern serves to form the gap required for injection of the liquid crystal and prevents leakage of the liquid crystal injected therein. The printing of the seal pattern is a process of screen printing a desired fixed pattern of a thermo-setting resin.

Then, spacers are spread uniformly on the substrate to maintain a fixed cell gap (st4). Fixed size spacers are used to maintain an accurate and consistent gap between the substrates. The spaces should be uniformly distributed on the lower substrate. The spacers may be spread by a wet spreading method in which the spacers are spread mixed with alcohol or by a dry spreading method in which only the spacers are spread. Two examples of dry spreading are an electrostatic method in which static electricity is used and an antistatic method in which a gas pressure is used. The antistatic method is mostly used for liquid crystal panels having a structure vulnerable to static electricity.

A black matrix layer is formed on another glass substrate, which is to be bonded with a substrate having the thin film transistors formed thereon. The black matrix shields portions of the substrate outside of the pixel region. Next, the R, G, B color filter layer is formed on each pixel region, and a common electrode is formed on the entire surface. Then, an alignment film is formed over the common electrode.

When the spacer spreading is finished, the substrate having the thin film transistor array formed thereon and the substrate having the color filter array formed thereon are bonded (st5). The method of bonding the thin film transistor array substrate and the color filter array substrate depends on the gap tolerance which typically is a few micrometers. A bonding error may allow light leakage which will degrade the picture quality of the liquid crystal cell.

Because the bonded substrates have a plurality of panels, the bonded substrates are cut into unit panels (st6). The cell is cut by scribing a cutting line on a substrate surface with a pen of diamond having hardness greater than the glass substrate and breaking the bonded substrates along the cutting line by applying a force.

Next, liquid crystal is injected into the space between the bonded substrates, and the liquid crystal injection hole is sealed (st7). A liquid crystal panel has a few hundred square centimeters of area and a gap of a few micrometers. Therefore, to effectively inject the liquid crystal into such a panel, a vacuum injection method is used in which a pressure difference between inside/outside of the panel forces liquid crystal into the gap.

The methods for spreading spacers described above have limitations. Consequently, there has been much research on methods of forming spacer patterns during the fabrication of the substrate. One method suggests creating a pattern of spacers made of an organic material on an upper substrate.

FIGS. 3A to 3F illustrate cross-sections of a panel showing the steps of a related art method of forming a spacer pattern on a color filter array substrate.

Referring to FIG. 3A, a light shielding metal is deposited on a transparent insulating substrate 5 and portions are removed to form a black matrix layer 6 to shield light from portions of the liquid crystal panel outside the pixel regions. The black matrix layer 6 may be a thin metal film of chrome Cr having an optical density greater than 3.5, a film of organic material or a bi-layered black matrix of chrome Cr/chrome oxide CrOx. Accordingly, the black matrix is formed of one of above materials depending on-the application.

Referring to FIG. 3B, the color filter layer 8a, 8b, 8c is formed on respective pixel regions, of R, G, B color resins. The main ingredients of the color resin are a photopolymerization type photosensitive composition of a photopolymerization initiator, a monomer, a binder, and organic pigments having colors of red/green/blue. A coat of the red color resin is formed on the entire surface of the substrate 5 having the black matrix formed thereon and removed selectively to form a red color filter layer 8a in the desired region. Next, a coat of a green color resin is formed on the entire surface of the substrate 5 having the red color filter layer 8a formed thereon and removed selectively to form a green color filter layer 8b in the desired region. Finally, a coat of blue color resin is formed on the entire surface of the substrate 5 having the red and green color filter layers 8a and 8b formed thereon and removed selectively to form a blue color filter layer 8c in the desired region.

Referring to FIG. 3C, a coat of transparent resin with an insulating property is formed on the substrate 5 to form an overcoat layer 26. The coat of transparent resin forms a flat surface over the color filter layers 8a, 8b and 8c.

In FIG. 3D, a common electrode 18 of a transparent metal, such as indium-tin-oxide (ITO) and indium-zinc-oxide (IZO), is formed on the overcoat layer. A common voltage will flow through the common electrode 18 to drive the liquid crystal 14 together with a pixel voltage that will flow through the pixel electrode 17 on the thin film transistor array substrate 22.

Next, in FIG. 3E, a transparent organic film is formed on the entire surface of the substrate 5 having the common electrode 18 formed thereon and subjected to photolithography and etching to form spacers 20 of required heights.

Referring to FIG. 3F, after the spacers 20 are formed, the entire surface of the substrate 5 is coated with a transparent organic insulating material such as polyimide to form an alignment film 22. Then, the surface of the alignment film 22 is rubbed in a predetermined direction. Thus, a related art color filter array substrate can be fabricated.

Alternatively the spacers 20 may be are patterned after the alignment film 22 is formed, but the alignment film 22 under the spacers 20 may be damaged by chemical used for patterning the spacers 20. Therefore, the alignment film 22 typically is formed after the spacers 20 are patterned.

FIG. 4 schematically illustrates the cross-section of a bonded thin film transistor array substrate and color filter array substrate with spacers formed thereon in a vertical position according to the related art. LCD devices are mostly employed as monitors, which are used in a vertical position when the LCD devices are in notebook computers or general LCD monitors. Also, during testing the LCD panel is placed in a vertical position. When the LCD panel is vertical the liquid crystal concentrates in the lower end due to gravity resulting in a difference in the liquid crystal concentration in the upper end and the lower end of the LCD panel. The higher liquid crystal concentration at the lower end causes the cell gap between the upper substrate 5 and the lower substrate 22 to vary from top to bottom which results in the cell gap between the substrates to become greater than the height of the column spacers 20 at the lower end of the LCD panel.

The uneven cell gap between the substrates and the separation of the column spacers 20 from the substrate in the lower side causes the picture quality to differ between the upper end and the lower end. This problem increases as the size of the LCD panel increases.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device with spacers that can adapt to the gap between substrates when liquid crystal is concentrated in the lower end due to gravity when a large LCD panel is placed in a vertical position. This will improve picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device includes opposite first and second substrates, and spacers between the first and second substrates, the spacers formed such that the spacers differ as positions of the spacers differ. The spacers in the lower end are larger in diameter and thickness than the spacers at the upper end when the liquid crystal panel is in a vertical position.

In addition, the spacers may have two or more different thicknesses. The spacers may be formed of photo. The spacers may be formed by an ink jet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
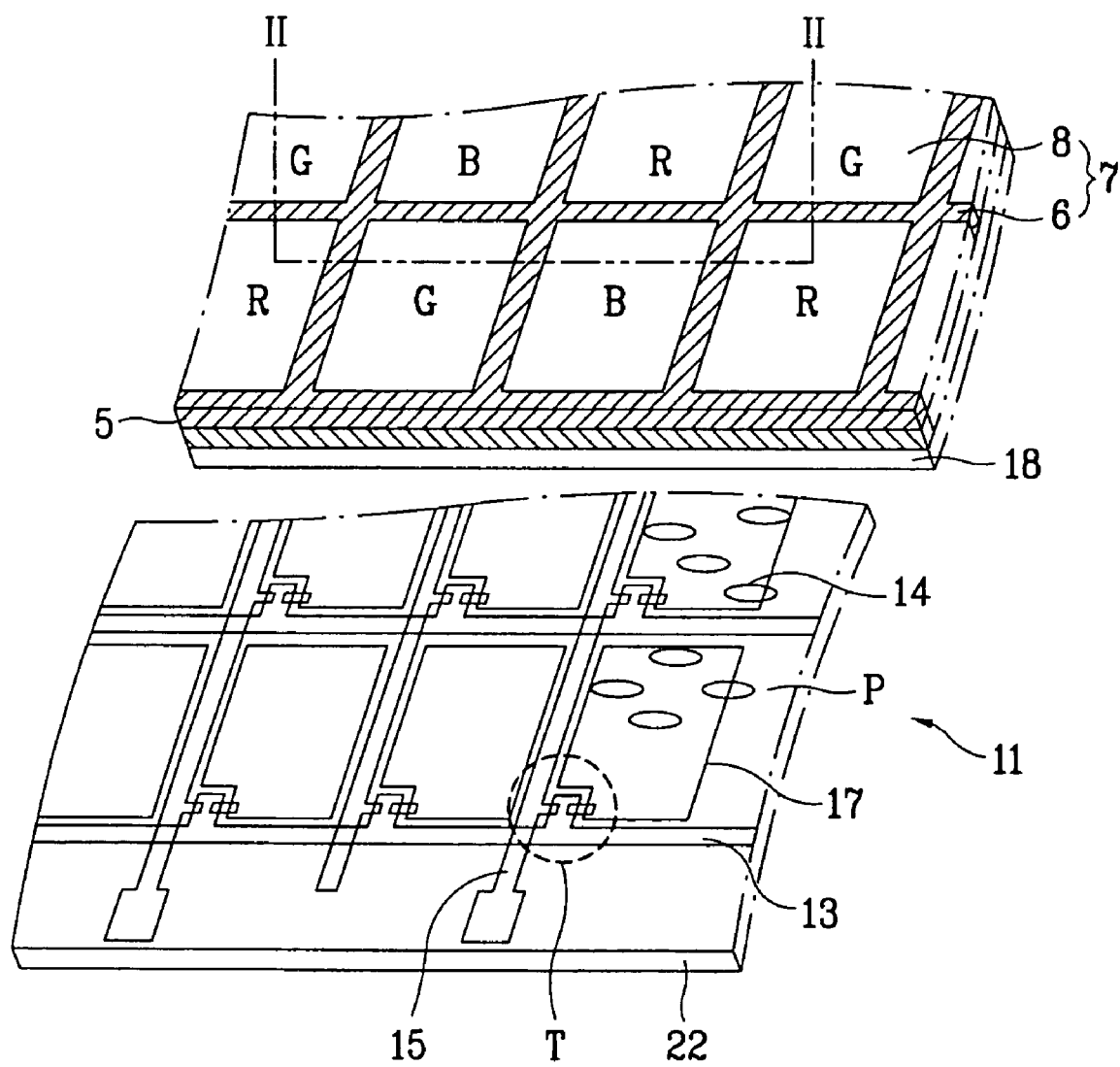
FIG. 1 illustrates a related art liquid crystal panel, schematically.
Figure 2:
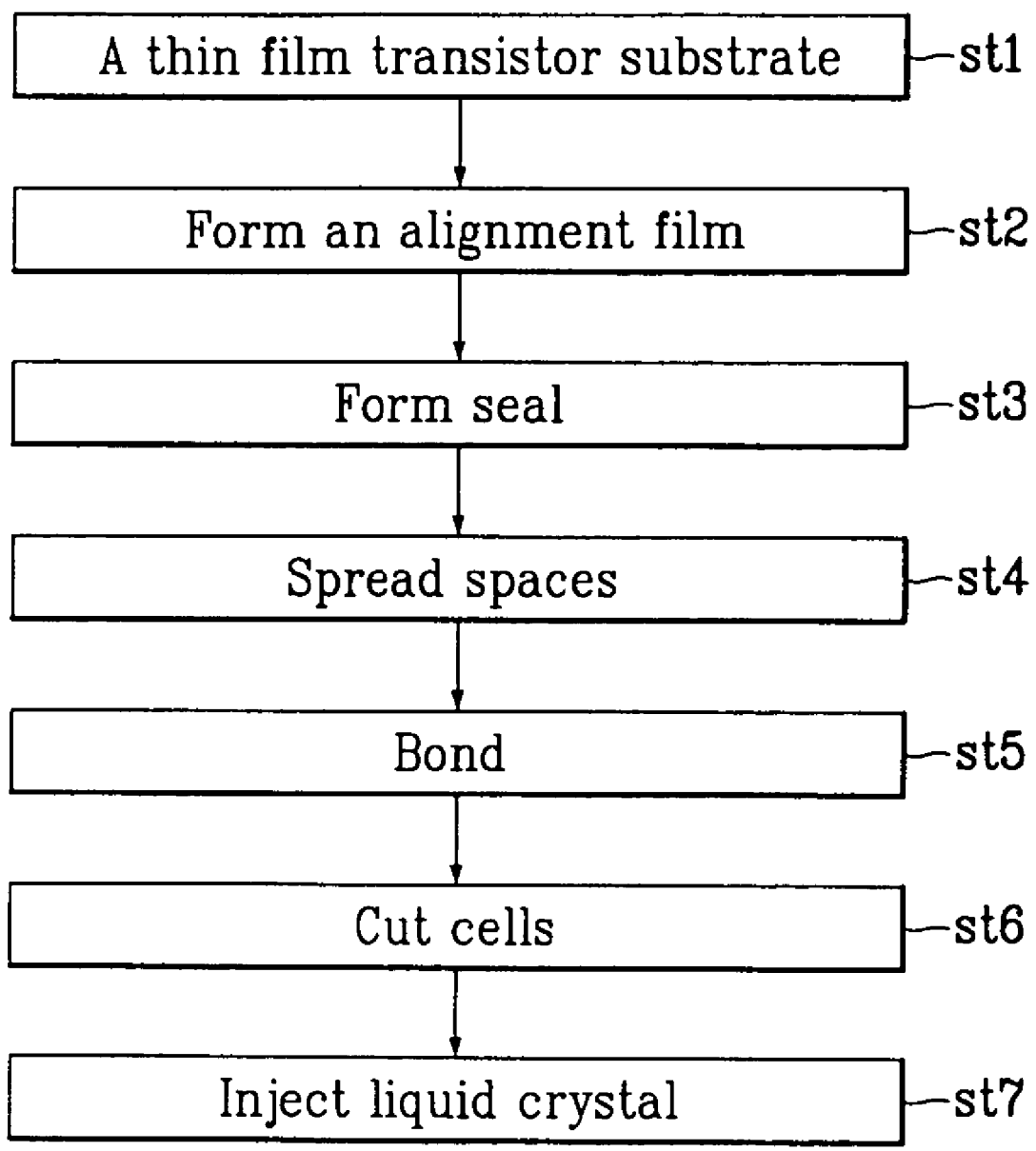
FIG. 2 illustrates a flow chart showing the steps of a related art method for fabricating a liquid crystal panel.
Figure 3A:
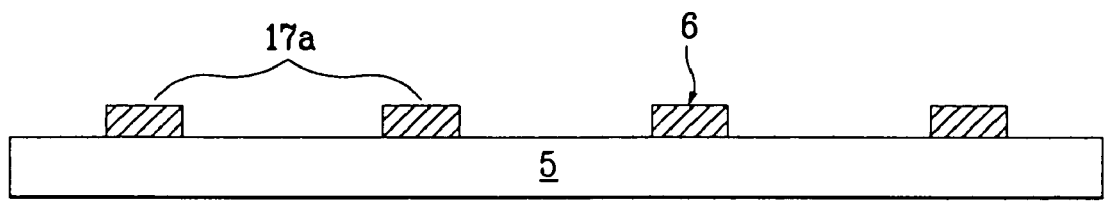
FIGS. 3A to 3F illustrate cross-sections of a panel showing the steps of a related art method of forming a spacer pattern on a color filter array substrate.
Figure 3B:
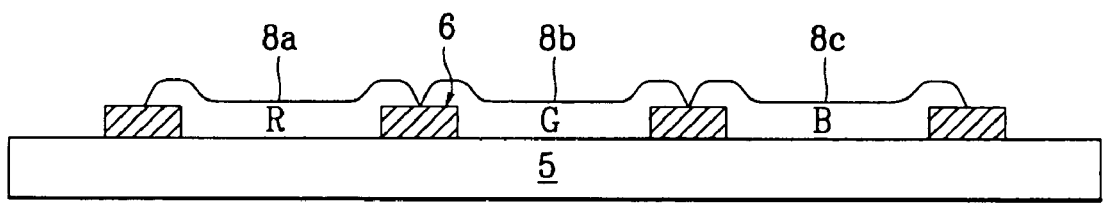
Figure 3C:
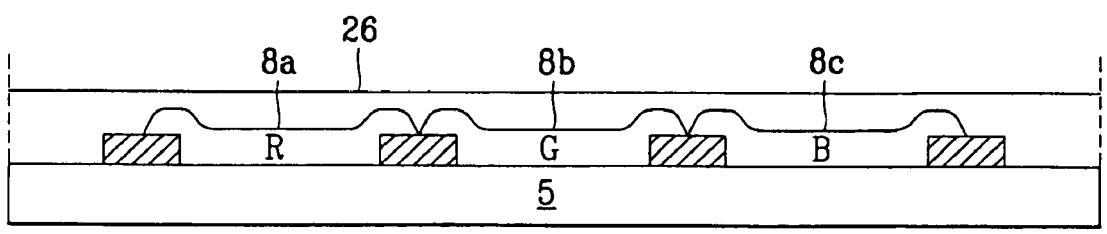
Figure 3D:
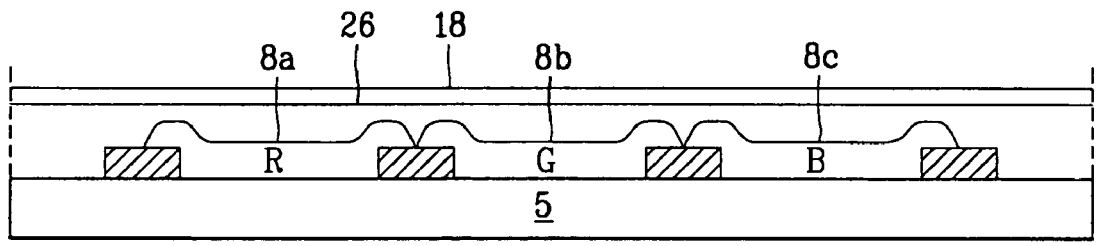
Figure 3E:
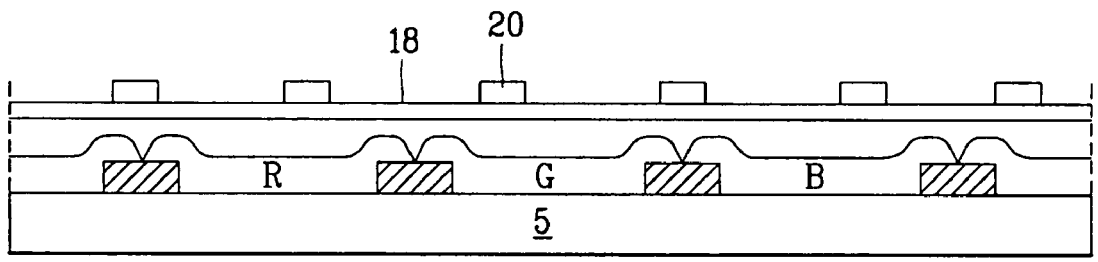
Figure 3F:
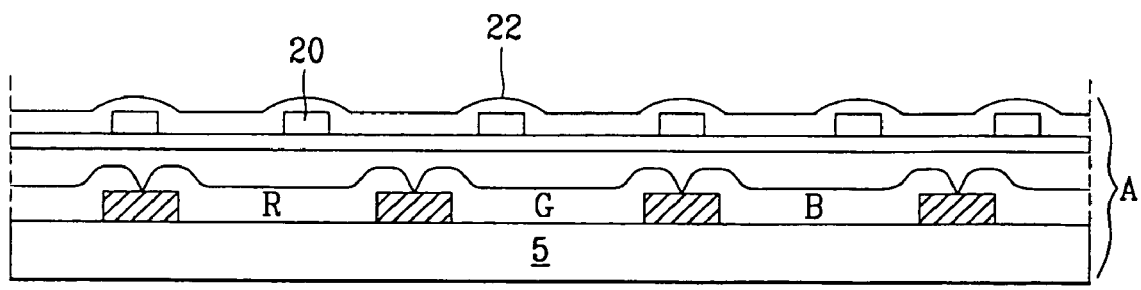
Figure 4:
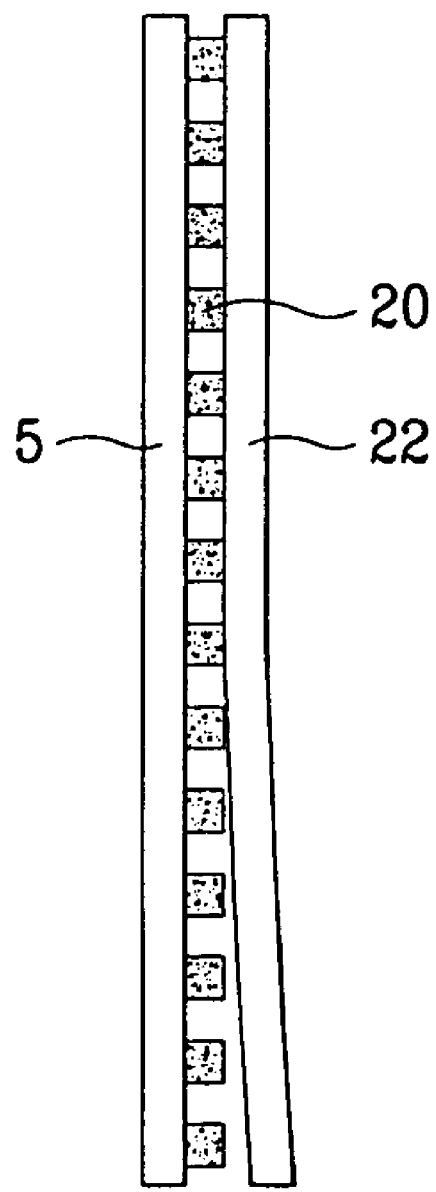
FIG. 4 illustrates the cross-section of a related art LCD panel, placed in a vertical position, schematically.
Figure 5:
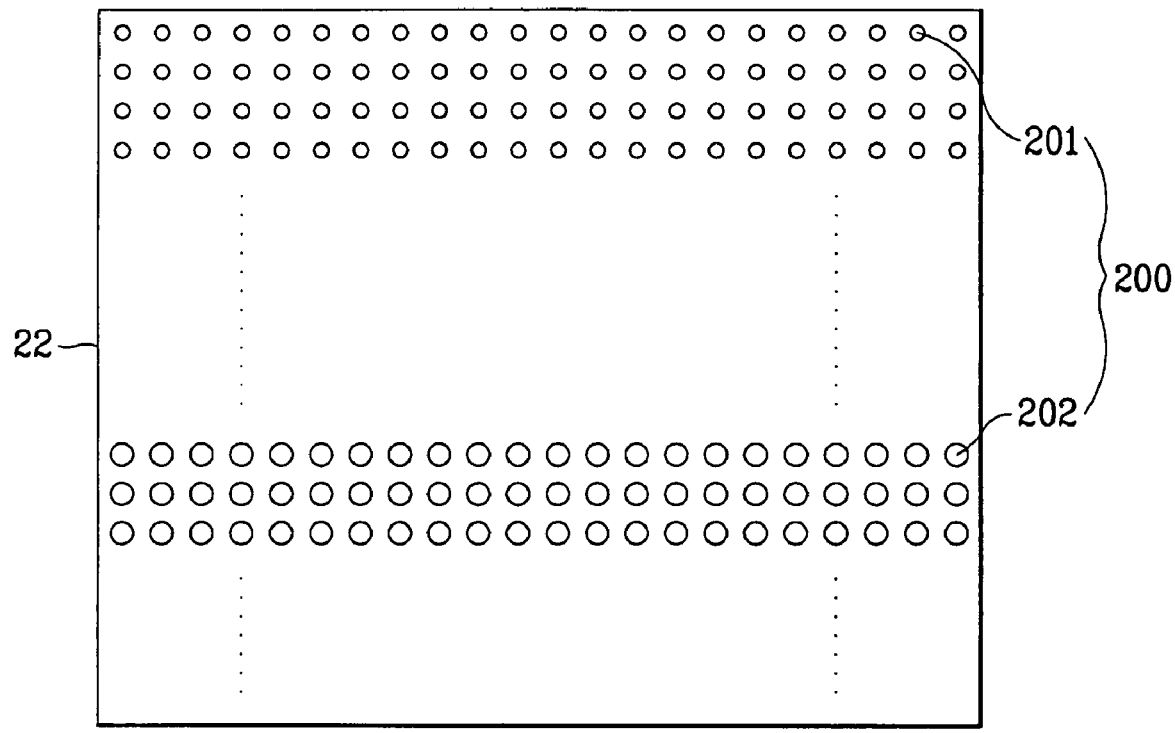
FIG. 5 illustrates a plan view showing a column spacer formation on a liquid crystal panel of an LCD device in accordance with a first preferred embodiment of the present invention.
Figure 6:
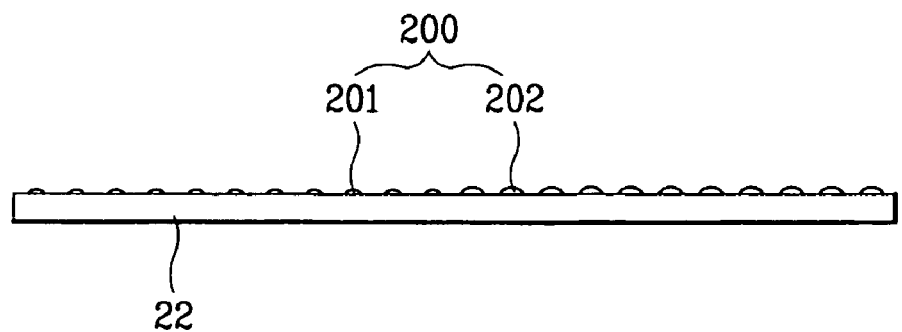
FIG. 6 illustrates a side view of the substrate in FIG. 5 having the column spacers formed thereon.

Reference will now be made in detail to the embodiments of the present invention, examples of which are illustrated in the accompanying drawings. FIG. 5 illustrates a plan view showing a column spacer formation on a liquid crystal panel of an LCD device in accordance with a first preferred embodiment of the present invention, and FIG. 6 illustrates a side view of the substrate in FIG. 5 having the column spacers formed thereon.

The column spacers 200 may be formed on a lower substrate 22 having a thin film transistor array formed thereon, or on an upper substrate 5 having a color filter array formed thereon. The embodiment shows column spacers 200 formed on the lower substrate 22.

Referring to FIG. 5, there may be small diameter column spacers 201 on the surface of the upper end of the lower substrate 22 and large diameter column spacers 202 on the surface of the lower end having a diameter more or less larger than the diameter of the column spacers 201 on the upper end. The column spacers 200 may be sprayed from a nozzle of an ink jet head. While, the use of the ink jet head to spay column spacers 200 of different sizes is disclosed, the ink jet head may also be used to spay column spaces 200 of substantially uniform size according to the present invention.

For convenience in the description, when the upper substrate 5 and the lower substrate 22 are bonded and in a vertical position the upper side of the LCD panel is called an upper end, and the lower side of the LCD panel is called a lower end.

Referring to FIG. 6, the column spacers 200 sprayed from the ink jet head differ; column spacers 201 on the upper end have lower heights and smaller diameters and column spacers 202 on the lower end have higher heights and larger diameters.

Figure 7:
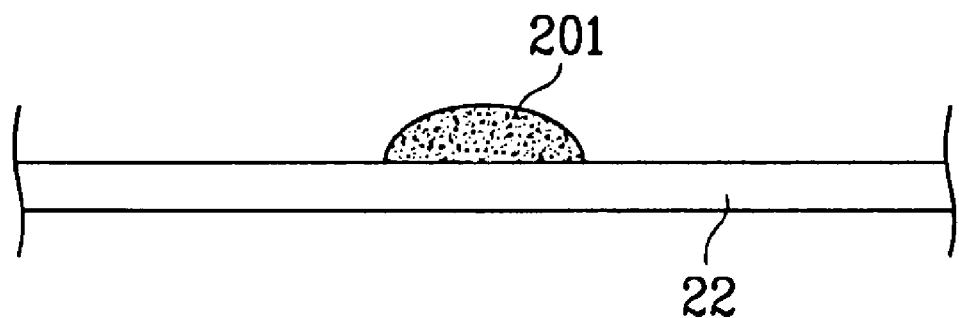
FIG. 7 illustrates an enlarged section of the column spacers placed at the upper end of the LCD panel in accordance with a first preferred embodiment of the present invention.
Figure 8:
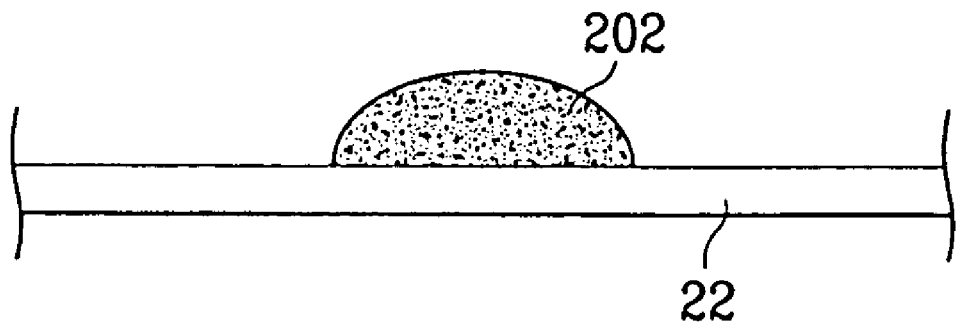
FIG. 8 illustrates an enlarged section of the column spacers placed at the lower end of the LCD panel in accordance with a first preferred embodiment of the present invention.

FIGS. 7 and 8 respectively illustrate the column spacers 201 and 202 in accordance with a first preferred embodiment of the present invention. The column spacers 201 in FIG. 7, illustrate an enlarged view of the column spacer 201 in the upper end of the lower substrate 22. The space 201 has a height for maintaining a cell gap between the lower substrate 22 and the upper substrate 5.

On the other hand, the column spacer 202 in FIG. 8 has a larger diameter and a higher height than the column spacer 201 in FIG. 7. The column spacer 202 is placed on the lower end of the substrate 22. The height of the column spacer 202 is set according to the expansion ratio of the cell gap between the lower substrate 22 and the upper substrate 5 due to gravity. The diameter or the height of the column spacer can be controlled by the ink jet head.

The gap expands from the upper side to the lower side. For an example, when the height of the column spacer 201 in the upper end is 3.5 μm, the height of the column spacer 202 in the lower part may be approx. 4 to 4.5 μm. Thus, when the difference of cell gaps between the upper end and the lower end is below 1 μm, it is preferable that the column spacers are sprayed taking the change in the cell gap into account.

Figure 9:
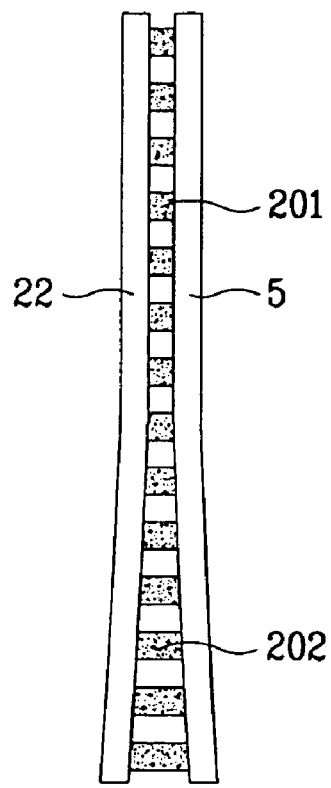
FIG. 9 illustrates a cross-section showing an LCD panel in a vertical position, in which column spacers are placed having different sizes in accordance with a first preferred embodiment of the present invention.

FIG. 9 illustrates schematically an LCD panel having the column spacers 200 sprayed, two substrates bonded, and liquid crystal injected between the two substrates in accordance with a first preferred embodiment of the present invention. When the LCD panel, is in a vertical position, there is a difference in the cell gaps at the upper end and the lower end. The column spacers 201 and 202 are spray coated so that the heights and diameters thereof differ to accommodate the difference in the cell gaps.

Figure 10:
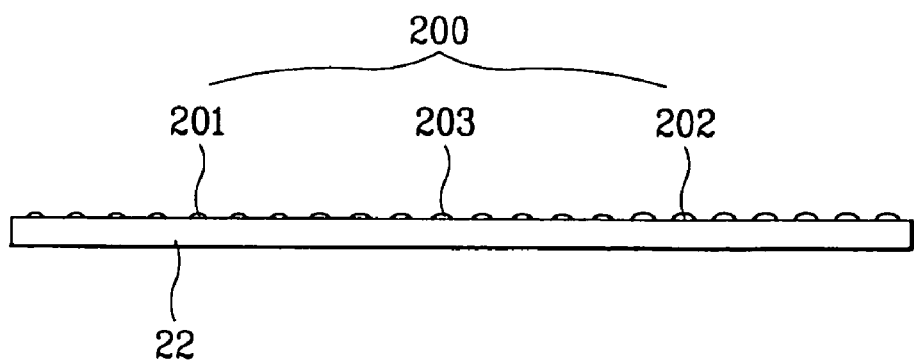
FIG. 10 illustrates a side cross-section of an LCD device with substrates and column spacers in accordance with a second preferred embodiment of the present invention.

FIG. 10 illustrates a section of an LCD device having column spacers formed with different heights and diameters in accordance with a second preferred embodiment of the present invention. As shown, the column spacers are distributed in three different areas. The size of the column spacers is different for an upper end, a middle area, and a lower end. The column spacers 201 sprayed on the upper end are the smallest; the column spacers 202 sprayed at the lower end are the largest; and the column spacers 203 sprayed on the middle area have a size between the sizes of the upper and lower column spacer sizes.

While the first and second embodiments described herein have column spacers with two and three different sizes respectively, any number of sizes may be used with the size of the spaces increasing from the upper end to the lower end.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   opposite first and second substrates; and
   column spacers between the first and second substrates,
      wherein the column spacers formed on one of the substrates such that the height of the column spacers differ as position of the column spacers differ,
      wherein the height of the column spacers differ as the position of the column spacers differ according to the expansion ratio of the cell gap between the first and second substrates due to gravity when the display device is in a vertical position, wherein the column spacers with great height are positioned lower only than the column spacers with small height.

2. The liquid crystal display device according to claim 1, wherein the column spacers have two or more different heights.

3. The liquid crystal display device according to claim 1, wherein the column spacers are formed of photo acryl.

4. The liquid crystal display device according to claim 1, wherein the column spacers are formed by an ink jet method.

5. The liquid crystal display device according to claim 1, wherein the height of the column spacers increases as it goes farther from an upper end to a lower end of the display device.

6. The liquid crystal display device according to claim 1, wherein the column spacers in an upper end of the display device have a 3.5 µm height and the column spacers in a lower end of the display device have a 4 to 4.5 µm height.

7. The liquid crystal display device according to claim 1, wherein the column spacers in an upper part have a height different from the column spacers at a lower end of the display device by less than 1 µm.

8. A liquid crystal display device comprising:

a thin film transistor substrate and a color filter substrate boned to each other; and at least two groups of column spacers, in different areas from each other, on one of the thin film transistor substrate and the color film substrate, wherein a height and a diameter of the at least one group of the column spacers is different from those of the other group of the column spacers, wherein the group of column spacers with the greatest height and diameter is located nearer to a bottom of the liquid crystal display device and the other group of column spacers is located nearer to a top of the liquid crystal display device due to gravity when the LCD device is in a vertical position, wherein the group of column spacers with great height and diameter are positioned lower only than the other group of column spacers of small height and diameter.

* * * * *